United States Patent [19]

Bartos et al.

[11] Patent Number: 4,631,260

[45] Date of Patent: Dec. 23, 1986

[54] PROCESS FOR PREPARING CERAMIC MATERIALS

[75] Inventors: Donald M. Bartos; John H. Gaul, Jr., both of Midland, Mich.

[73] Assignee: Dow Corning Corporation, Midland, Mich.

[21] Appl. No.: 868,177

[22] Filed: May 23, 1986

Related U.S. Application Data

[62] Division of Ser. No. 748,109, Jun. 24, 1985.

[51] Int. Cl.$^4$ ............................................. C04B 35/56
[52] U.S. Cl. ........................................ 501/88; 501/87; 423/345
[58] Field of Search ....................... 501/87, 88, 89, 90; 423/345

[56] References Cited

U.S. PATENT DOCUMENTS

| | | | |
|---|---|---|---|
| 3,447,952 | 6/1969 | Hertl | 501/88 X |
| 3,813,340 | 5/1974 | Knippenberg et al. | 501/88 X |
| 4,097,294 | 6/1978 | Rice et al. | 501/87 OR |
| 4,284,612 | 8/1981 | Horne, Jr. et al. | 501/88 X |
| 4,414,403 | 11/1983 | Schilling, Jr. et al. | 501/88 X |
| 4,492,681 | 1/1985 | Endou et al. | 423/345 OR |
| 4,497,787 | 2/1985 | Schilling, Jr. et al. | 501/88 X |
| 4,500,504 | 2/1985 | Yamamoto | 501/88 X |

Primary Examiner—William R. Dixon, Jr.
Assistant Examiner—Karl Group
Attorney, Agent, or Firm—Robert L. McKellar

[57] ABSTRACT

A method of preparing ceramic materials or articles by the pyrolysis of preceramic silazane polymers, wherein the preceramic silazane polymers are rendered infusible prior to pyrolysis by treatment with steam or a steam and oxygen mixture, is disclosed. This method is especially suited for the preparation of ceramic fibers.

30 Claims, No Drawings

PROCESS FOR PREPARING CERAMIC MATERIALS

This is a divisional of co-pending application Ser. No. 748,109 filed on Jun. 24, 1985.

BACKGROUND OF THE INVENTION

This invention relates to the preparation of ceramic materials or articles by the pyrolysis of preceramic silazane polymers wherein the preceramic silazane polymers are rendered infusible prior to pyrolysis by treatment with steam or a steam and oxygen mixture. This method is especially suited for the preparation of ceramic fibers.

The prior art discloses that ceramic materials have been prepared by the pyrolysis of preceramic silazane polymers. Gaul in U.S. Pat. No. 4,312,970 (issued Jan. 26, 1982) obtained ceramic materials by the pyrolysis of preceramic silazane polymers, which polymers were prepared by reacting organochlorosilanes and disilazanes. The preceramic silazane polymers were pyrolyzed in an inert atmosphere without any separate treatment to render the silazane preceramic polymer infusible.

Gaul in U.S. Pat. No. 4,340,619 (issued July 20, 1982) obtained ceramic materials by the pyrolysis of preceramic silazane polymers, which polymers were prepared by reacting chlorine-containing disilanes and disilazanes. Fibers prepared from such preceramic silazane polymers were given a "mild heat treatment" in air before pyrolysis but there is no teaching that such a treatment rendered the fibers infusible.

Cannady in U.S. patent application Ser. No. 555,755, filed Nov. 28, 1983 obtained ceramic materials by the pyrolysis of preceramic silazane polymers, which polymers were prepared by reacting trichlorosilane and disilazane. The preceramic silazane polymers were not rendered infusible prior to pyrolysis, in order to form ceramic materials.

What has been discovered is a method of rendering preceramic silazane polymers infusible prior to pyrolysis. This method represents a significant advance in the art of preparing ceramic materials or articles, especially in the art of preparing ceramic fibers.

THE INVENTION

This invention relates to a method of preparing a ceramic material, which method comprises (1) treating a preceramic silazane polymer with steam for a time sufficient to render the preceramic silazane polymer infusible wherein the treatment temperature is sufficiently low so that the preceramic silazane polymer remains unfused during the treatment step and (2) heating the infusible preceramic silazane polymer of step (1) in an inert atmosphere, vacuum or ammonia-containing atmosphere to a temperature of at least 750° C. until said infusible preceramic silazane polymer is converted to a ceramic material.

This invention also relates to a method of preparing a ceramic material, which method comprises (1) treating a preceramic silazane polymer with steam at a temperature below the penetration temperature of the preceramic silazane polymer for a time sufficient to render the preceramic silazane polymer infusible and (2) heating the infusible preceramic silazane polymer of step (1) in an inert atmosphere, vacuum or ammonia-containing atmosphere to a temperature of at least 750° C. until said infusible preceramic silazane polymer is converted to a ceramic material.

This invention also relates to a method of preparing a ceramic material, which method comprises (1) treating a preceramic silazane polymer with a steam and oxygen mixture for a time sufficient to render the preceramic silazane polymer infusible wherein the treatment temperature is sufficiently low so that the preceramic silazane polymer remains unfused during the treatment step and (2) heating the infusible preceramic silazane polymer of step (1) in an inert atmosphere, vacuum or ammonia-containing atmosphere to a temperature of at least 750° C. until said infusible preceramic silazane polymer is converted to a ceramic material.

This invention also relates to a method of preparing a ceramic material, which method comprises (1) treating a preceramic silazane polymer with a steam and oxygen mixture at a temperature below the penetration temperature of the preceramic silazane polymer for a time sufficient to render the preceramic silazane polymer infusible and (2) heating the infusible preceramic silazane polymer of step (1) in an inert atmosphere, vacuum or ammonia-containing atmosphere to a temperature of at least 750° C. until said infusible preceramic silazane polymer is converted to a ceramic material.

This invention further relates to ceramic fibers prepared by the method comprising the steps of (1) preparing a preceramic silazane polymer, (2) preparing preceramic fibers from said preceramic silazane polymer, (3) treating the preceramic fibers prepared in step (2) with steam or a steam and oxygen mixture for a time sufficient to render the preceramic fibers infusible wherein the treatment temperature is sufficiently low so that the preceramic silazane fibers remain unfused during the treatment step and (4) heating the infusible preceramic fibers of step (3) in an inert atmosphere, vacuum or ammonia-containing atmosphere to a temperature of at least 750° C. until said infusible preceramic fibers are converted to ceramic fibers.

This invention also relates to ceramic fibers prepared by the method comprising the steps of (1) preparing a preceramic silazane polymer, (2) preparing preceramic fibers from said preceramic silazane polymer, (3) treating the preceramic fibers prepared in step (2) with steam or a steam and oxygen mixture at a temperature below the penetration temperature of the preceramic fibers for a time sufficient to render the preceramic fibers infusible and (4) heating the infusible preceramic fibers of step (3) in an inert atmosphere, vacuum or ammonia-containing atmosphere to a temperature of at least 750° C. until said infusible preceramic fibers are converted to ceramic fibers.

Passage of steam or a steam and oxygen mixture over a preceramic silazane polymer will result in an infusible preceramic silazane polymer suitable for pyrolysis to form a ceramic material. Preceramic silazane polymers in the form of pellets, powders, flakes, foams, fibers, and the like are especially suitable for treatment with steam or a steam and oxygen mixture by the method of this invention. The pressure of the steam or the steam and oxygen mixture is not critical. High pressure steam may be used. It is preferred, however, that pressures at or near atmospheric pressure be used for ease of operation. The steam or steam and oxygen mixture may, if desired, contain inert gas diluents such as argon, nitrogen and the like. The oxygen in the steam and oxygen mixture may be pure or relatively pure oxygen or may be in the form of air. By "steam" we mean both essentially 100 weight percent water vapor and water vapor in an inert carrier gas such as nitrogen, argon, helium, carbon dioxide and the like.

The temperature of the treatment of the preceramic silazane with the steam or steam and oxygen mixture must be sufficiently low so that the preceramic polymer does not melt or fuse during the treatment step. Preferably the treatment temperature is below the penetration temperature or softening temperature of the preceramic silazane polymer. The treatment temperature must be above the temperature at which the steam will condense as water droplets on the preceramic silazane polymer being treated. As one skilled in the art would realize, the penetration temperature of individual preceramic silazane polymers will depend in large part upon the reactants and reaction conditions employed to prepare each preceramic silazane polymers. Therefore the penetration temperature of a given preceramic silazane polymer should be determined to establish the preferred upper temperature limit of treatment with steam or a steam and oxygen mixture. More preferably the temperature of the treatment with steam or a steam and oxygen mixture should be between about 35° C. and about 10° C. below the penetration temperature of the preceramic silazane polymer. The treatment temperature must be, however, above the temperature at which steam will condense as water droplets on the preceramic silazane polymer being treated. The pressure of the treatment gas can be varied to help control condensation. Shorter treatment times to render the preceramic silazane polymer infusible can be expected if the treatment temperature is kept as high as possible. Within these constraints, it generally has been found that temperatures between about 35° and 200° C. are suitable. One way to avoid the possibility of water condensing on the ceramic article during treatment is to use air or oxygen saturated with water vapor at room temperature and a treatment temperature greater than about 10° C. above room temperature.

The preceramic silazane polymers are treated with steam or a steam and oxygen mixture for a time sufficient to render the preceramic silazane polymer infusible. What is meant by "infusible" in this specification is that the treated preceramic silazane polymer when heated rapidly up to the pyrolysis temperature will not fuse together. A crude screen for infusibility is provided by the solubility of the preceramic silazane polymer in toluene. Prior to treatment with steam or a steam and oxygen mixture the preceramic silazane polymers are almost completely soluble in toluene. The infusible preceramic silazane polymers obtained by treatment by the method of this invention are either insoluble in toluene or have only limited solubility in toluene. The time required to render the preceramic silazane polymer infusible by the method of this invention will depend, in part, on the size of the preceramic silazane polymer object, the temperature of the treatment, the amount of water vapor or water vapor and oxygen present, and the specific preceramic silazane polymer employed. The time required to render the preceramic silazane polymer infusible will normally be in the range of a few minutes to several hours or longer. It is best to determine the treatment time by routine experimentation.

The amount of steam or steam and oxygen mixture that the preceramic silazane polymer should be exposed to is the amount sufficient to render the preceramic silazane polymer infusible. This required amount will vary from case to case depending, in part, upon the temperature, pressure, the time of exposure and the actual preceramic silazane polymer used as well as other variables. When the preceramic silazane polymer is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the nonfused interior to leak out.

Preceramic silazane polymers suitable for use in this present invention are well known in the art. The preceramic silazane polymers suitable for use in this invention must be capable of being converted to a ceramic material at elevated temperatures. It is generally preferred that the preceramic silazane polymers used in this invention be capable of being converted to a ceramic material in at least 40 weight percent yield. Mixtures of preceramic silazane polymers may also be used in this invention. Examples of preceramic silazane polymers or polysilazanes suitable for use in this invention include polysilazanes as described by Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983), all of which are hereby incorporated by reference. Suitable polysilazanes also include those described by Haluska in U.S. Pat. No. 4,482,689 (issued Nov. 13, 1984) and by Seyferth et al. in U.S. Pat. No. 4,397,828 (issued Aug. 9, 1983), both of which are hereby incorporated by reference. Other polysilazanes suitable for use in this invention are disclosed by Cannady in U.S. patent applications Ser. No. 555,755 (filed Nov. 28, 1983), Ser. No. 627,260 (filed July 2, 1984), and Ser. No. 689,258 (filed Jan. 7, 1985), by Bujalski in U.S. patent application Ser. No. 653,003 (filed Sept. 21, 1984), and by Baney et al. in U.S. patent applications Ser. No. 652,938 (filed Sept. 21, 1984) and Ser. No. 653,939 (filed Sept. 21, 1984), all of which are hereby incorporated by reference. Still other polysilazanes may be suitable for use in this invention.

Preceramic silazane polymers especially useful in this invention are described in U.S. Pat. Nos. 4,312,970 and 4,340,619 and U.S. patent application Ser. No. 555,755 filed Nov. 28, 1983, all of which have been incorporated by reference.

The preceramic silazane polymers described in U.S. Pat. No. 4,312,970 are prepared by contacting and reacting in an inert, essentially anhydrous, atmosphere, an organochlorosilane or a mixture of organochlorosilanes of the general formula $$R'_c SiCl_{(4-c)}$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

The organochloromonosilanes of U.S. Pat. No. 4,312,970 are those having the general formula $$R'_c SiCl_{(4-c)}$$

where R' is vinyl or an alkyl radical containing 1-3 carbon atoms or the phenyl group. Thus, those groups which are contemplated as being useful in this invention are methyl, ethyl, propyl, vinyl, and phenyl. The R' groups can all be the same or they can be different. The organochloromonosilanes are common commodity chemicals and are commercially available and, therefore, an explanation as to their preparation does not appear to be necessary. The value of c is 1 or 2. Thus, single organic group substituted silanes such as $CH_3SiCl_3$, $C_6H_5SiCl_3$, $CH_2=CHSiCl_3$, $CH_3CH_2SiCl_3$ or $CH_3(CH_2)_2SiCl_3$ and double organic substituted silanes such as $(CH_3)_2SiCl_2$, $(C_2H_5)_2SiCl_2$ and $(CH_2=CH)(CH_3)SiCl_2$ and mixtures of such silanes, for example $CH_3SiCl_3$ and $(CH_3)_2SiCl_2$, can be used. It is preferred that when organochlorosilane mixtures are used, the number of units of diorganosubstituted silicon atoms should not exceed the number of units of monoorgano-substituted silicon atoms.

The preceramic silazane polymers of U.S. Pat. No. 4,340,619 are prepared by contacting and reacting in an inert, essentially anhydrous, atmosphere, a chlorine-containing disilane or a mixture of chlorine-containing disilanes, of the general formula $$(Cl_d R'_e Si)_2$$

with a disilazane having the general formula $$(R_3Si)_2NH$$

at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5-3; e has a value of 0-2.5 and the sum of (d+e) is equal to three.

The chlorine-containing disilanes of U.S. Pat. No. 4,340,619 are those disilanes having the general formula $$(Cl_d R'_e Si)_2$$

where R' is vinyl, an alkyl radical containing 1-3 carbon atoms or the phenyl group. Thus, the R' groups are methyl, ethyl, propyl, vinyl and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes. For the chlorine-containing disilanes described above, the value of d and e is from 0.5-3 and 0-2.5 respectively, and the sum of (d+e) is equal to three. Examples of chlorine-containing disilanes are $Cl_2(CH_3)Si)_2$, $(Cl(CH_3)_2Si)_2$, $(Cl_2C_2H_5Si)_2$, $(Cl(C_6H_5)_2Si)_2$ and $(Cl_2(CH_2=CH)Si)_2$. Monosilanes can also be used in admixtures with the above described chlorine-containing disilanes. Examples include $CH_3SiCl_3$, $(CH_3)_2SiCl_2$, $H(CH_3)_2SiCl$, $(CH_3)_3SiCl$, $(CH_2=CH)(CH_3)_2SiCl$, $(C_2H_5)_2SiCl_2$, $C_6H_5SiCl_3$, as well as $(C_6H_5)_2SiCl_2$, and $(C_6H_5)_3SiCl$. When polysilazane polymers are prepared in accordance with U.S. Pat. No. 4,340,619 for use in this invention it is preferred that mixtures of chlorine-containing disilanes be employed where the number of units of diorgano-substituted silicon atoms does not exceed the number of units of monoorgano-substituted silicon atoms.

The preceramic silazane polymers of application Ser. No. 555,755 are prepared by contacting and reacting in an inert, essentially anhydrous atmosphere, trichlorosilane with a disilazane at a temperature in the range of 25° to 300° C. while removing byproduced volatile products, wherein said disilazane has the general formula $$(R_3Si)_2NH$$

where R is selected from the group consisting of vinyl, hydrogen, phenyl, and alkyl radicals containing 1 to 3 carbon atoms. It appears that some component, possibly a hydrolysis product, in aged trichlorosilane is detrimental in the preparation of this preceramic silazane polymer. Such contaminated trichlorosilanes can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. Nos. 4,312,970, 4,340,619, and application Ser. No. 555,755 is a disilazane of the general formula $(R_3Si)_2NH$. R in this formula is vinyl, hydrogen, an alkyl radical of 1-3 carbon atoms or the phenyl group. Therefore, R, for purposes of this formula, is represented by hydrogen, methyl, ethyl, propyl, vinyl and phenyl. Each R group in this formula can be the same or they can be different. Examples of the disilazanes include $((CH_3)_3Si)_2NH$, $(C_6H_5(CH_3)_2Si)_2NH$, $((C_6H_5)_2CH_3Si)_2NH$, $(CH_2=CH(CH_3)_2Si)_2NH$, $(CH_2=CH(CH_3)C_6H_5Si)_2NH$, $(CH_2=CH(C_6H_5)_2Si_2NH$, $(CH_2=CH(C_2H_5)_2Si)_2NH$, $(H(CH_3)_2Si)_2NH$ and $(CH_2=CH(C_6H_5)C_2H_5Si)_2NH$.

The reactants in U.S. Pat. Nos. 4,312,970, 4,340,619, and application Ser. No. 555,755 are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619 and application Ser. No. 555,755 the reaction begins which forms an intermediate amino compound. Upon heating, additional amino compound is formed and upon continued heating, R$_3$SiCl is distilled from the reaction mixture and a silazane polymer is formed. The order of addition of the materials does not appear to be critical. As the temperature is raised higher, more condensation takes place and crosslinking occurs with residual R$_3$Si— that is not distilled from the mixture acting as a chain stopper. This control allows one to stop the reaction at any point to obtain almost any desired viscosity. The desirable temperature range for this reaction is 25° to 300° C. A preferred temperature range for this reaction is 125° to 300° C. The length of time that the reaction requires depends on the temperature employed and the viscosity one wishes to achieve. What is meant by "volatile products" are the distillable byproduced products that are formed by the reactions set forth above. These materials can be represented by (CH$_3$)$_3$SiCl, (CH$_2$=CH)(C$_6$H$_5$)$_2$SiCl, CH$_3$(C$_6$H$_5$)$_2$SiCl, (CH$_3$)$_2$C$_6$H$_5$SiCl and (CH$_2$=CH)(CH$_3$)$_2$SiCl. Sometimes, the process requires the use of a vacuum along with the heat in order to remove these materials from the reaction mixture.

After the preceramic silazane polymer has been rendered infusible by treatment with steam or a steam and oxygen mixture, the infusible preceramic silazane polymer is fired to an elevated temperature of at least 750° C. in an inert atmosphere, vacuum or ammonia-containing atmosphere until the mixture is converted to a ceramic material. Preferably the pyrolysis temperature is from about 1000° C. to about 1600° C. Since the preceramic silazane polymers of this invention have been rendered infusible prior to pyrolysis, the pyrolysis step may be carried out by quickly raising the temperature to the desired level. If the preceramic silazane polymer is of sufficient viscosity or if it possesses a sufficiently low melt temperature, it can be shaped first, then rendered infusible, and then finally pyrolyzed to give a ceramic shaped article such as a fiber. Preferably the preceramic silazane polymers used in the practice of this invention have a penetration temperature of about 50° to 300° C. and most preferably in the range of 70° to 200° C. Such a penetration temperature allows for the formation of preceramic silazane fibers by known spinning techniques.

So that those skilled in the art can better appreciate and understand the invention, the following examples are given. Unless otherwise indicated, all percentages are by weight. The preceramic polymers were fired to elevated temperature using either an Astro Industries Furnace 1000A water cooled graphite resistance heated model 1000.3060-FP-12, a Lindberg tube furnace (Heavy Duty SB Type S4877A) or a Thermolyne F-21100 tube furnace.

Oxygen was determined using LECO analysis.

The penetration temperature of the preceramic silazane polymer was measured with a DuPont Instruments Thermoanalyzer Model 1090 equipped with a Model 1091 DuPont Disk Memory and a DuPont Model 943 Thermomechanical Analyzer. The penetration temperature is related to the softening point temperature.

The tensile strength and elastic modulus were determined on a single fiber employing a computer controlled Instron tester Model 1122 equipped with pneumatic jaws and a 500 g load cell. Values reported are an average of ten individual tests. The procedure used was similar to ASTM 3379-75.

EXAMPLE 1

A preceramic silazane polymer, labeled polymer A, was prepared by reacting a mixture of disilanes obtained from the direct process and phenylvinyldichlorosilane with hexamethyldisilazane. The mixture of disilanes and phenylvinyldiclorosilane contained 49.1 weight percent Cl$_2$CH$_3$SiSiCH$_3$Cl$_2$, 28.2 weight percent Cl$_2$CH$_3$SiSi(CH$_3$)$_2$Cl, 6.4 weight percent Cl(CH$_3$)$_2$SiSi(CH$_3$)$_2$Cl, 0.7 weight percent low boiling impurities, and 15.4 weight percent (C$_6$H$_5$)(CH$_2$=CH)SiCl$_2$. The hexamethyldisilazane was added to the disilane mixture at a level equivalent to 0.75 moles of N—H present in the hexamethyldisilazane per mole of Si—Cl present in the disilane and silane mixture. The resulting mixture was heated at a rate of 1.1° C./min. to 230° C. All reaction steps were carried out under a nitrogen atmosphere. Volatiles were removed by distillation throughout the heating process. The resulting silazane polymer A had a penetration temperature of about 70° C. Preceramic fibers were prepared by standard spinning techniques at 144° C. by extrusion through a spinneret with 0.01 inch diameter holes. The preceramic silazane fibers prepared from polymer A were approximately 30 microns in diameter.

Another preceramic silazane polymer, labeled polymer B, was prepared in a similar manner except as noted. The mixture of disilanes and phenylvinyldiclorosilane contained 49.8 weight percent Cl$_2$CH$_3$SiSiCH$_3$Cl$_2$, 27.7 weight percent Cl$_2$CH$_3$SiSi(CH$_3$)$_2$Cl, 6.7 weight percent Cl(CH$_3$)$_2$SiSi(CH$_3$)$_2$Cl, 1.0 weight percent low boiling impurities, and 14.7 weight percent (C$_6$H$_5$)(CH$_2$=CH)SiCl$_2$. The resulting mixture was heated at a rate of 1.1° C./min. to 230° C. and held at 230° C. for 30 minutes. The resulting polymer B had a penetration temperature of about 136° C. Preceramic fibers were prepared by standard spinning techniques at 219° C. The preceramic silazane fibers prepared from polymer B were approximately 15 microns in diameter.

A small sample (0.1–0.5 g) of fibers was placed in a glass tube inserted in a tube furnace. The fibers were cured or rendered infusible by exposure to humidified air at various temperatures for varying lengths of time. The humidified air was prepared by bubbling air through liquid water at room temperature before passage over the fibers. The humidified air was at about 100 percent relative humidity at room temperature. After treatment with humidified air the fibers were pyrolyzed in an argon atmosphere by heating the fibers at a rate of 3° C./min. to 1200° C. The results are presented in Table I. For runs where only one temperature is given, the fibers were exposed to the humidified air at a constant temperature for the listed amount of time. Where a temperature range is given, the fibers were exposed to the humidified air by heating from the lower to higher temperature at a rate of 3.75° C./min and then holding at the higher temperature for the remainder of the specified time. None of the fibers treated with humidified air under the conditions indicated in Table I melted or fused together upon pyrolysis to 1200° C. Preceramic fibers which were not cured or rendered infusible did fuse together upon pyrolysis to 1200° C.

TABLE I

| POLYMER | CURE CONDITIONS | | CERAMIC FIBERS | |
|---|---|---|---|---|
| | TEMP (°C.) | TIME (hrs) | OXYGEN (%) | CERAMIC YIELD (%) |
| A | 65 | 17.0 | 10.8 | 74.3 |
| B | 65–150 | 22.5 | 24.0 | 74.0 |
| B | 65–175 | 31.0 | 27.0 | 75.0 |
| B | 65–200 | 36.0 | 30.0 | 77.0 |

EXAMPLE 2

Another preceramic silazane polymer was prepared using the procedures outlined in U.S. patent application Ser. No. 555,755 (filed Nov. 28, 1983). The preceramic polymer was prepared by mixing one equivalent of trichlorosilane with 2.25 equivalents of hexamethyldisilazane at 0°–15° C. The mixture was held at room temperature overnight and then heated at a rate of 1° C./min. to 250° C. The reaction mixture was held at 250° C. for one hour. All reaction steps were carried out under an argon atmosphere. During the heating period, volatiles were removed by distillation. The preceramic polymer was cooled, dissolved in toluene, filtered through a 0.45 micron membrane, and then strip distilled at 250° C. under vacuum in a molecular still. The resulting preceramic polymer had a penetration temperature of 76° C. The preceramic polymer was spun into fibers using a melt rheometer with a single 0.02 inch orifice at a temperature of 154° C. The preceramic fibers had diameters of 40–50 microns.

One sample of these preceramic fibers was fired in a 100 volume percent ammonia atmosphere. The fibers were not cured prior to the ammonia pyrolysis. After the pyrolysis to 1200° C. the fiber had melted and fused together.

Another sample of these preceramic fibers was cured by exposure to humidified air. The fiber were exposed to humidified air (about 8 cfh flow and 100 percent relative humidity at room temperature) where the temperature was raised from 35° to 165° C. at a rate of 2.7° C./hr.

Both cured and uncured fiber samples were pyrolyzed to 1200° C. in a 100 volume percent ammonia atmosphere. Samples with no cure melted and fused during pyrolysis to 1200° C. Cured fibers did not melt or fuse when pyrolyzed to 1200° C. The results are given in Table II. Uncured preceramic fibers gave a white, fused, ceramic mass with a ceramic yield of 50.7 weight percent. Cured preceramic fibers gave white ceramic fibers with a ceramic yield of 63.6 weight percent which contained 31.4 weight percent nitrogen and about 0.1 weight percent carbon and which had a tensile strength of 26 MPa and an elastic modulus of 6.9 GPa.

EXAMPLE 3

Preceramic silazane fibers similar to those used in Example 2 were used in this example. The fibers were treated with humidified air containing approximately 100 percent relative humidity at room temperature using the procedure of Example 1. The cured fibers were then pyrolyzed in an argon atmosphere to 1200° C. as in Example 1. The results are presented in Table II. None of the fibers treated with humidified air under the conditions indicated in Table II melted or fused together upon pyrolysis to 1200° C. Preceramic fibers which were not cured or rendered infusible did fuse together upon pyrolysis to 1200° C.

TABLE II

| CURE CONDITIONS | | CERAMIC FIBERS | |
|---|---|---|---|
| TEMP (°C.) | TIME (hrs) | OXYGEN (%) | CERAMIC YIELD (%) |
| 35–100 | 48 | 3.0 | 58.6 |
| 35–120 | 22 | 1.2 | — |
| 35–155 | 32 | 2.1 | — |
| 35–165 | 48 | 17.8 | 64.0 |
| 35–211 | 47 | 10.9 | — |

EXAMPLE 4

A preceramic silazane polymer was prepared by reacting a mixture of disilanes obtained from the direct process, methylvinyldichlorosilane, and methylhydrogendichlorosilane with hexamethyldisilazane. The mixture of disilanes, methylvinyldichlorosilane, and methylhydrogendichlorsilane contained 50.0 weight percent $Cl_2CH_3SiSiCH_3Cl_2$, 36.6 weight percent $Cl_2CH_3SiSi(CH_3)_2Cl$, 2.9 weight percent $Cl(CH_3)_2SiSi(CH_3)_2Cl$, 5.8 weight percent $(CH_3)(CH_2=CH)SiCl_2$, and 4.7 weight percent $CH_3(H)SiCl_2$. The hexamethyldisilazane was added to the disilane and silane mixture at a level equivalent to 0.75 moles of N—H present in the hexamethyldisilazane per mole of Si—Cl present in the disilane and silane mixture. The resulting mixture was heated at a rate of 2.5° C./min. to 80° C. and held at 80° C. for 20 minutes. The temperature was then raised to 220° C. at a rate of 1.0° C./min. and held at 220° C. for 10 minutes. All reaction steps were carried out under an argon atmosphere. Volatiles were removed throughout the heating process. This preceramic silazane polymer had a penetration temperature of 112° C. Fibers were prepared from this material with an average diameter of about 40 microns.

The preceramic silazane fibers were exposed to steam or steam and oxygen atmosphere in the same tube furnace used for the later pyrolysis step. The preceramic fibers were placed in a boat in the center of the tube furnace. The system was first flushed with argon. Then the desired gas was passed over the sample boat at the desired temperature. Steam was generated by passage of the desired gas over liquid water prior to entering the tube furnace. The amount of steam in the gas phase was controlled by varying the temperature of the liquid water. The temperature of the liquid water and the preceramic material being treated were controlled independently. After completion of the steam or steam and oxygen treatment, the system was purged with argon and the temperature of the tube furnace increased to the desired pyrolysis temperature under an argon atmosphere.

Two techniques were employed to gauge the effectiveness of the steam or steam and oxygen mixture treatment step in rendering the preceramic silazane fibers infusible. A simple solubility test was used to estimate the effectiveness of the treatment step of this invention. A small amount of the fibers was placed in toluene at room temperature and the degree of solubility was observed. Uncured material was essentially completely soluble in toluene whereas material which had been rendered infusible was essentially insoluble in toluene. The second method to evaluate the degree of cure or degree to which the preceramic silazane polymer had been rendered infusible was actual pyrolysis. Pyrolysis is a direct test to measure the effectiveness of the treatment. If the fibers do not fuse together, the treatment was sufficient to render the material or fibers infusible. Two basic pyrolysis schedules were employed. With "slow pyrolysis", preceramic fibers were heated at 5° to 13° C./min. to 1200° C. in argon. With "fast pyrolysis", preceramic fibers were heated at 100° C./min. to 600° C. in argon. Fibers which did not fuse during the pyrolysis treatment were considered to have been rendered infusible by the steam or steam and oxygen mixture treatment and were rated "pass". Fibers which were uncured failed both the slow and fast pyrolysis tests. The results are presented in Table III.

TABLE III

| CURE CONDITIONS | | | SOLU-BIL- | PYROLYSIS | |
|---|---|---|---|---|---|
| GAS | TEMP (°C.) | TIME (min.) | ITY | SLOW | FAST |
| O$_2$/H$_2$O | 152 | 1 | slightly soluble | pass | pass |
| O$_2$/H$_2$O | 155 | 2 | very slightly soluble | pass | pass |
| O$_2$/H$_2$O | 160 | 3 | insoluble | pass | pass |
| argon/ H$_2$O | 158 | 1 | mostly insoluble | pass | pass |

That which is claimed is:

1. A method of preparing a ceramic material, which method comprises (1) treating a preceramic silazane polymer with steam at a temperature in the range of 35° C. to 200° C. for a time sufficient to render the preceramic silazane polymer infusible wherein the treatment temperature is sufficiently low so that the preceramic silazene polymer remains unfused during the treatment step, and (2) heating the infusible preceramic silazane polymer of step (1) in an inert atmosphere, vacuum or ammonia-containing atmosphere to a temperature of at least 750° C. until said infusible preceramic silazane polymer is converted to a ceramic material.

2. A method as defined in claim 1 wherein said preceramic silazane polymer is treated with steam at a temperature below the penetration temperature of said preceramic silazane polymer and wherein said preceramic silazane polymer is prepared by contacting and reacting in an inert, essentially anhydrous, atmosphere, an organochlorosilane or a mixture of organochlorosilanes of the general formula R'$_c$SiCl$_{(4-c)}$ with a disilazane having the general formula (R$_3$Si)$_2$NH at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

3. A method as defined in claim 1 wherein said preceramic silazane polymer is treated with steam at a temperature below the penetration temperature of said preceramic silazane polymer and wherein said preceramic silazane polymer is prepared by contacting and reacting in an inert, essentially anhydrous, atmosphere, a chlorine-containing disilane or a mixture of chlorine-containing disilanes, of the general formula (Cl$_d$R'$_e$Si)$_2$ with a disilazane having the general formula (R$_3$Si)$_2$NH at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5–3; e has a value of 0–2.5 and the sum of (d+e) is equal to three.

4. A method as defined in claim 1 wherein said preceramic silazane polymer is treated with steam at a temperature below the penetration temperature of said preceramic silazane polymer and wherein said preceramic silazane polymer is prepared by contacting and reacting in an inert, essentially anhydrous atmosphere, trichlorosilane with a disilazane at a temperature in the range of 25° C. to 300° C. while removing byproduced volatile products, wherein said disilazane has the general formula (R$_3$Si)$_2$NH where R is selected from the group consisting of vinyl, hydrogen, phenyl, and alkyl radicals containing 1 to 3 carbon atoms.

5. A method as defined in claim 1 wherein said preceramic silazane polymer is treated with steam at a temperature below the penetration temperature of said preceramic silazane polymer and wherein said preceramic silazane polymer is prepared by contacting and reacting in an inert, essentially anhydrous, atmosphere, a mixture of (1) chlorine-containing disilane or a mixture of chlorine-containing disilanes, of the general formula (Cl$_d$R'$_e$Si)$_2$ and (2) an organochlorosilane or a mixture of organochlorosilanes of the general formula R'$_c$SiCl$_{(4-c)}$ with a disilazane having the general formula (R$_3$Si)$_2$NH at a temperature in the range of 25° C. to 300° C. while distilling byproduced volatile products, wherein R' is selected from the group consisting of vinyl, phenyl, and alkyl radicals containing 1 to 3 carbon atoms; R is selectedf rom the group consisting of vinyl, hydrogen, phenyl, and alkyl radicals containing 1 to 3 carbon atoms; d has a value of 0.5–3; e has a value of 0–2.5; the sum of (d+e) is equal to three; and c has a value of 1 or 2.

6. A method as defined in claim 1 wherein said perceramic polymer is treated with steam in the temperature range of 35° C. to 10° C. below the penetration temperature of said preceramic silazane polymer.

7. A method as defined in claim 2 wherein said preceramic polymer is treated with steam in the temperature range of 35° C. to 10° C. below the penetration temperature of said preceramic silazane polymer.

8. A method as defined in claim 3 wherein said preceramic polymer is treated with steam in the temperature range of 35° C. to 10° C. below the penetration temperature of said preceramic silazane polymer.

9. A method as defined in claim 4 wherein said preceramic polymer is treated with steam in the temperature range of 35° C. to 10° C. below the penetration temperature of said preceramic silazane polymer.

10. A method as defined in claim 5 wherein said preceramic polymer is treated with steam in the temperature range of 35° C. to 10° C. below the penetration temperature of said preceramic silazane polymer.

11. A method of preparing a ceramic material, which method comprises (1) treating a preceramic silazane polymer with a steam and oxygen mixture at a temperature in the range of 35° C. to 200° C. for a time sufficient to render the preceramic silazane polymer infusible wherein the treatment temperature is sufficiently low so that the preceramic silazane polymer remains unfused during the treatment step, and (2) heating the infusible preceramic silazane polymer of step (1) in an inert atmosphere, vacuum or ammonia-containing atmosphere to a temperature of at least 750° C. until said infusible preceramic silazane polymer is converted to a ceramic material.

12. A method as defined in claim 11 wherein said preceramic silazane polymer is treated with said steam and oxygen mixture at a temperature below the penetration temperature of said preceramic silazane polymer and said preceramic silazane polymer is prepared by contacting and reacting in an inert, essentially anhydrous, atmosphere, an organochlorosilane or a mixture of organochlorosilanes of the general formula $R'_c SiCl_{(4-c)}$ with a disilazane having the general formula $(R_3Si)_2NH$ at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

13. A method as defined in claim 11 wherein said preceramic silazane polymer is treated with said steam and oxygen mixture at a temperature below the penetration temperature of said preceramic silazane polymer and said preceramic silazane polymer is prepared by contacting and reacting in an inert, essentially anhydrous, atmosphere, a chlorine-containing disilane or a mixture of chlorine-containing disilanes, of the general formula $(Cl_d R'_e Si)_2$ with a disilazane having the general formula $(R_3Si)_2NH$ at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5–3; e has a value of 0–2.5 and the sum of (d+e) is equal to three.

14. A method as defined in claim 11 wherein said preceramic silazane polymer is treated with said steam and oxygen mixture at a temperature below the penetration temperature of said preceramic silazane polymer and said preceramic silazane polymer is prepared by contacting and reacting in an inert, essentially anhydrous atmosphere, trichlorosilane with a disilazane at a temperature in the range of 25° C. to 300° C. while removing byproduced volatile products, wherein said disilazane has the general formula $(R_3Si)_2NH$ where R is selected from the group consisting of vinyl, hydrogen, phenyl, and alkyl radicals containing 1 to 3 carbon atoms.

15. A method as defined in claim 11 wherein said preceramic silazane polymer is treated with said steam and oxygen mixture at a temperature below the penetration temperature of said preceramic silazane polymer and said preceramic silazane polymer is prepared by contacting and reacting in an inert, essentially anhydrous, atmosphere, a mixture of (1) chlorine-containing disilazane or a mixture of chlorine-containing disilanes, of the general formula $(Cl_d R'_e Si)_2$ and (2) an organochlorosilane or a mixture of organochlorosilanes of the general formula $R'_c SiCl_{(4-c)}$ with a disilazane having the general formula $(R_3Si)_2NH$ at a temperature in the range of 25° C. to 300° C. while distilling byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5–3; e has a value of 0–2.5; the sum of (d+e) is equal to three; and c has a value of 1 or 2.

16. A method as defined in claim 11 wherein said oxygen in said steam and oxygen mixture is in the form of air.

17. A method as defined in claim 12 wherein said oxygen in said steam and oxygen mixture is in the form of air.

18. A method as defined in claim 13 wherein said oxygen in said steam and oxygen mixture is in the form of air.

19. A method as defined in claim 14 wherein said oxygen in said steam and oxygen mixture is in the form of air.

20. A method as defined in claim 15 wherein said oxygen in said steam and oxygen mixture is in the form of air.

21. A method as defined in claim 16 wherein said preceramic polymer is treated with said steam and oxygen mixture in the temperature range of 35° C. to 10° C. below the penetration temperature of said preceramic silazane polymer.

22. A method as defined in claim 17 wherein said preceramic polymer is treated with said steam and oxygen mixture in the temperature range of 35° C. to 10° C. below the penetration temperature of said preceramic silazane polymer.

23. A method as defined in claim 18 wherein said preceramic polymer is treated with said steam and oxygen mixture in the temperature range of 35° C. to 10° C. below the penetration temperature of said preceramic silazane polymer.

24. A method as defined in claim 19 wherein said preceramic polymer is treated with said steam and oxygen mixture in the temperature range of 35° C. to 10° C. below the penetration temperature of said preceramic silazane polymer.

25. A method as defined in claim 20 wherein said preceramic polymer is treated with said steam and oxygen mixture in the temperature range of 35° C. to 10° C. below the penetration temperature of said preceramic silazane polymer.

26. A method as defined in claim 21 wherein the relative humidity of said steam and oxygen mixture at about room temperature is about 100 percent.

27. A method as defined in claim 22 wherein the relative humidity of said steam and oxygen mixture at about room temperature is about 100 percent.

28. A method as defined in claim 23 wherein the relative humidity of said steam and oxygen mixture at about room temperature is about 100 percent.

29. A method as defined in claim 24 wherein the relative humidity of said steam and oxygen mixture at about room temperature is about 100 percent.

30. A method as defined in claim 25 wherein the relative humidity of said steam and oxygen mixture at about room temperature is about 100 percent.

* * * * *

UNITED STATES PATENT AND TRADEMARK OFFICE
CERTIFICATE OF CORRECTION

PATENT NO. : 4,631,260
DATED : December 23, 1986
INVENTOR(S) : Donald M. Bartos and John H. Gaul, Jr.

It is certified that error appears in the above-identified patent and that said Letters Patent is hereby corrected as shown below:

Column 11, line 35
Delete "silazene" and Insert --silazane--

Column 12, line 65
Delete "perceramic and Insert --preceramic--

Signed and Sealed this

Eleventh Day of October, 1988

Attest:

DONALD J. QUIGG

Attesting Officer      Commissioner of Patents and Trademarks